(12) United States Patent
Tod et al.

(10) Patent No.: US 12,099,354 B2
(45) Date of Patent: *Sep. 24, 2024

(54) SYSTEMS AND METHODS FOR MONITORING A SELF-DRIVING VEHICLE

(71) Applicant: Clearpath Robotics Inc., Kitchener (CA)

(72) Inventors: Anthony William Tod, St. Agatha (CA); Ryan Christopher Gariepy, Kitchener (CA)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/471,626

(22) Filed: Sep. 21, 2023

(65) Prior Publication Data
US 2024/0045423 A1 Feb. 8, 2024

Related U.S. Application Data

(63) Continuation of application No. 17/400,433, filed on Aug. 12, 2021, now Pat. No. 11,796,999, which is a continuation of application No. 16/044,598, filed on Jul. 25, 2018, now Pat. No. 11,119,476.

(60) Provisional application No. 62/537,195, filed on Jul. 26, 2017.

(51) Int. Cl.
G05D 1/02 (2020.01)
G05D 1/00 (2006.01)
H04N 7/18 (2006.01)

(52) U.S. Cl.
CPC ......... *G05D 1/0038* (2013.01); *G05D 1/0016* (2013.01); *G05D 1/0291* (2013.01); *H04N 7/183* (2013.01)

(58) Field of Classification Search
CPC .. G05D 1/0038; G05D 1/0291; G05D 1/0016; G05D 2201/0216; G05D 1/0033; G05D 1/0274; G05D 1/024; H04N 7/183
USPC ......................................... 700/257
See application file for complete search history.

(56) References Cited

U.S. PATENT DOCUMENTS

| | | | |
|---|---|---|---|
| 9,910,432 B1 | 3/2018 | Chambers et al. | |
| 2007/0061040 A1 | 3/2007 | Augenbraun et al. | |
| 2011/0288684 A1 | 11/2011 | Farlow et al. | |
| 2012/0041593 A1 | 2/2012 | Ichinose et al. | |
| 2014/0365258 A1 | 12/2014 | Vestal et al. | |
| 2015/0103170 A1* | 4/2015 | Nelson | G06Q 10/20 348/148 |
| 2015/0190925 A1 | 7/2015 | Hoffman et al. | |
| 2016/0139594 A1 | 5/2016 | Okumura et al. | |

(Continued)

*Primary Examiner* — Masud Ahmed

(57) ABSTRACT

Systems and methods for monitoring a self-driving vehicle are presented. The system comprises a camera, a processor, a communications transceiver, a computer-readable medium, and a display device. The processor can be configured to receive an image of a self-driving vehicle from the camera, and vehicle information from the self-driving vehicle. A graphic comprising the image of the self-driving vehicle and a visual representation of the vehicle information is then displayed on the display device. The vehicle information may comprise any or all of vehicle-status information, vehicle-mission information, vehicle-metric information, and vehicle-environment information.

21 Claims, 9 Drawing Sheets

(56) References Cited

U.S. PATENT DOCUMENTS

2017/0203446 A1 7/2017 Dooley et al.
2018/0321687 A1 11/2018 Chambers et al.

* cited by examiner

SYSTEMS AND METHODS FOR MONITORING A SELF-DRIVING VEHICLE

CROSS-REFERENCE TO RELATED APPLICATIONS

This application is a continuation of U.S. patent application Ser. No. 17/400,433, filed on Aug. 12, 2021, which is a continuation of U.S. patent application Ser. No. 16/044,598 (issued as U.S. Pat. No. 11,119,476), filed on Jul. 25, 2018, which claims priority from U.S. Provisional Patent Application No. 62/537,195, filed on 26 Jul. 2017. The content of each of U.S. patent application Ser. Nos. 17/400,433 and 16/044,598 and U.S. Provisional Patent Application No. 62/537,195 is incorporated herein by reference for all purposes.

FIELD

The described embodiments relate to systems and methods for monitoring a vehicle, and in particular, for monitoring a self-driving vehicle using a monitoring device.

BACKGROUND

The use of self-driving vehicles in industrial facilities brings with it the generation of significant and meaningful data. However, the self-driving vehicles used in industrial facilities generally lack sophisticated user-interfaces or graphical displays. Therefore, much of this data is unavailable, or, at the very least, is cumbersome and inconvenient to access.

Many common situations within industrial facilities represent a need for immediate and convenient access to some or all of the data generated in association with the self-driving vehicles. For example, if a vehicle unexpectedly stops while operating in the facility, there may be several plausible causes, yet, determining the cause in a given situation may be difficult without taking cumbersome steps to access relevant data.

There remains a need for human operators to quickly and conveniently access the data that is generated in association with self-driving vehicles used within an industrial facility.

SUMMARY

In a first aspect, there is a device for monitoring a self-driving vehicle. The device comprises a processor, a camera, a communications transceiver for communicating with the self-driving vehicle, non-transitory computer-readable media, and a display device. The computer-readable medium stores instructions that, when executed, configure the processor to receive an image of the self-driving vehicle from the camera, receive vehicle information from the self-driving vehicle, and display a graphic comprising an image of the self-driving vehicle and a visual representation the vehicle information on the display device.

According to some embodiments, the vehicle information comprises vehicle-status information.

According to some embodiments, the vehicle-status information comprises a vehicle operating state.

According to some embodiments, the vehicle information comprises vehicle-mission information.

According to some embodiments, the vehicle-mission information comprises a destination location.

According to some embodiments, the vehicle information comprises vehicle-environment information.

According to some embodiments, the vehicle-environment information comprises sensor scan data.

According to some embodiments, the vehicle-environment information comprises camera data.

According to some embodiments, the graphic further comprises at least one input button for receiving commands for controlling the movement of the self-driving vehicle.

In a second aspect, there is a method for monitoring a self-driving vehicle. A monitoring device in communication with a self-driving vehicle is used to identify the self-driving vehicle. An image of the self-driving vehicle is captured using the monitoring device. A graphic comprising the image of the self-driving vehicle and a visual representation of the vehicle information is displayed.

According to some embodiments, the method may comprise the preliminary step of forming a communications connection between the monitoring device and a server associated with the self-driving vehicle, wherein identifying the self-driving vehicle using the monitoring device is based on identifying the server using the communications connection.

According to some embodiments, the method may comprise the preliminary step of capturing a preliminary image of a visual identifier tag on the self-driving vehicle, wherein identifying the self-driving vehicle is based on the visual identifier tag in the preliminary image.

According to some embodiments, the self-driving vehicle is a first self-driving vehicle, the preliminary image is a first preliminary image, the image is a first image, the vehicle information is first-vehicle information. The method may further comprise capturing a second preliminary image of a second visual identifier tag on a second self-driving vehicle. The second self-driving vehicle is identified based on the second visual identifier tag in the second preliminary image. A second image of the second self-driving vehicle is captured using the monitoring device, and second-vehicle information is requested from the second self-driving vehicle using the monitoring device. The displayed graphic comprises the first image of the first self-driving vehicle and the visual representation of the first-vehicle information in association with the first image, and the second image of the second self-driving vehicle and a visual representation of the second-vehicle information in association with the second image.

According to some embodiments, the vehicle information comprises vehicle-state information.

According to some embodiments, the vehicle information comprises vehicle-mission information.

According to some embodiments, the vehicle information comprises vehicle-environment information.

According to some embodiments, the graphic further comprises at least one input button for receiving commands for controlling the movement of the self-driving vehicle.

In a third aspect, there is a system for monitoring a plurality of self-driving vehicles. The system comprises a fleet-management system, a display terminal, and at least one camera. The display terminal has a display device, a processor, and a non-transitory computer-readable medium storing instructions that, when executed, configure the processor to receive an image of one of the plurality of self-driving vehicles from the camera, identify the self-driving vehicle, receive vehicle information, and display a graphic on the display device comprising the image of the self-driving vehicle and a visual representation of the vehicle information.

According to some embodiments, the instructions may further configure the processor to receive vehicle information associated with the self-driving vehicle from the fleet-management system based on the identity of the at least one self-driving vehicle.

According to some embodiments, the instructions may further configure the processor to determine a location of the self-driving vehicle based on the image and receive the identity of the self-driving vehicle from the fleet-management system based on the location.

BRIEF DESCRIPTION OF THE DRAWINGS

A preferred embodiment of the present invention will now be described in detail with reference to the drawings, in which.

DESCRIPTION OF EXEMPLARY EMBODIMENTS

Figure 1:
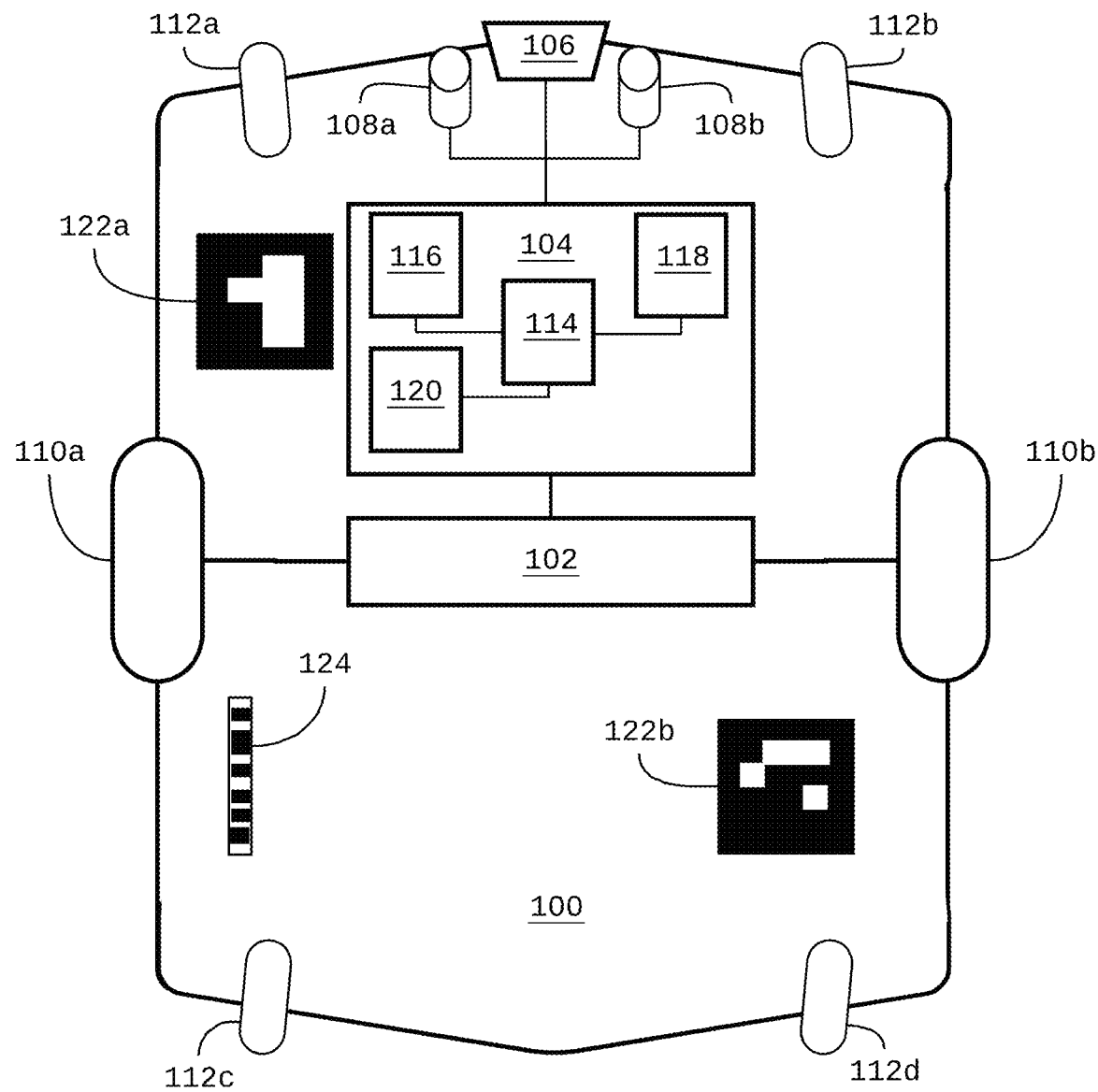
FIG. 1 is a system diagram of a self-driving vehicle according to some embodiments.

Referring to FIG. 1, there is shown a self-driving vehicle 100 according to some embodiments. The vehicle comprises a drive system 102, a vehicle control system 104, and one or more sensors 106, 108a, and 108b.

The drive system 102 includes a motor and/or brakes connected to drive wheels 110a and 110b for driving the vehicle 100. According to some embodiments, the motor may be an electric motor, combustion engine, or a combination/hybrid thereof. Depending on the particular embodiment, the drive system 102 may also include control interfaces that can be used for controlling the drive system 102. For example, the drive system 102 may be controlled to drive the drive wheel 110a at a different speed than the drive wheel 110b in order to turn the vehicle 100. Different embodiments may use different numbers of drive wheels, such as two, three, four, etc.

According to some embodiments, additional wheels 112 may be included (as shown in FIG. 1, the wheels 112a, 112b, 112c, and 112d may be collectively referred to as the wheels 112). Any or all of the additional wheels 112 may be wheels that are capable of allowing the vehicle 100 to turn, such as castors, omni-directional wheels, and mecanum wheels.

The vehicle control system 104 comprises a processor 114, a memory 116, a computer-readable non-transitory medium 118, and a communications transceiver 120, such as a wireless transceiver for communicating with a wireless communications network (e.g. using an IEEE 802.11 protocol or similar, also known as "WiFi").

One or more sensors 106, 108a, and 108b may be included in the vehicle 100. For example, according to some embodiments, the sensor 106 may be a LiDAR device (or other optical/laser, sonar, or radar range-finding sensor). The sensors 108a and 108b may be optical sensors, such as video cameras. According to some embodiments, the sensors 108a and 108b may be optical sensors arranged as a pair in order to provide three-dimensional (e.g. binocular or RGB-D) imaging.

The vehicle control system 104 uses the medium 118 to store computer programs that are executable by the processor 114 (e.g. using the memory 116) so that the vehicle control system 104 can provide automated or autonomous operation to the vehicle 100. Furthermore, the vehicle control system 104 may also store an electronic map that represents the known environment of the vehicle 100, such as a manufacturing facility, in the media 118.

For example, the vehicle control system 104 may plan a path for the vehicle 100 based on a known destination location and the known location of the vehicle. Based on the planned path, the vehicle control system 104 may control the drive system 102 in order to drive the vehicle 100 along the planned path. As the vehicle 100 is driven along the planned path, the sensors 106, and/or 108a and 108b may update the vehicle control system 104 with new images of the vehicle's environment, thereby tracking the vehicle's progress along the planned path and updating the vehicle's location. In other embodiments, the vehicle control system 104 may rely in part or in whole on a user-defined path.

Since the vehicle control system 104 receives updated images of the vehicle's environment, and since the vehicle control system 104 is able to autonomously plan the vehicle's path and control the drive system 102, the vehicle control system 104 is able to determine when there is an obstacle in the vehicle's path, plan a new path around the obstacle, and then drive the vehicle 100 around the obstacle according to the new path.

According to some embodiments, the vehicle control system 104 may additionally provide a computer server. For example, the processor 114, the memory 116, the medium 118, and the communications transceiver 120 may be configured in order to provide a web server (e.g. using HTTP) which may be made available on a local-area network (LAN), wide-area network (WAN, or over the Internet). The server may be configured to provide components of the systems and methods described herein, such as for providing vehicle information to a monitoring device.

According to some embodiments, fiducial markers 122a and 122b may be placed on the vehicle 100. The fiducial markers 122a and 122b may generally be used to visually orient the vehicle 100, for example, based on an image of the vehicle 100 that includes the fiducial markers 122a and 122b. In some cases, an image of the vehicle 100 that includes the fiducial markers 122a and 122b may be analyzed in order to determine position in terms of vertical, lateral, and longitudinal distances such as (x, y, z) coordinates, as well as orientation in terms of vertical, lateral, and longitudinal angular displacements such as yaw, pitch, and roll. This analysis may include analysis of a single fiducial marker in respect of itself, or of a combination of two or more fiducial markers compared with each other.

According to some embodiments, two or more fiducial markers may be placed on each surface of the vehicle 100. The front, back, and two side surfaces of the vehicle 100 are not shown in FIG. 1, and, thus, only the fiducial markers 122a and 122b are shown.

Additionally, in some embodiments, a label such as a barcode 124 may be included on the vehicle 100 in order to provide additional information to sensors such as optical scanners or RFID readers. For example, a label may provide connection information such as a uniform resource locator (URL) or IP address associated with the vehicle 100.

Figure 2:
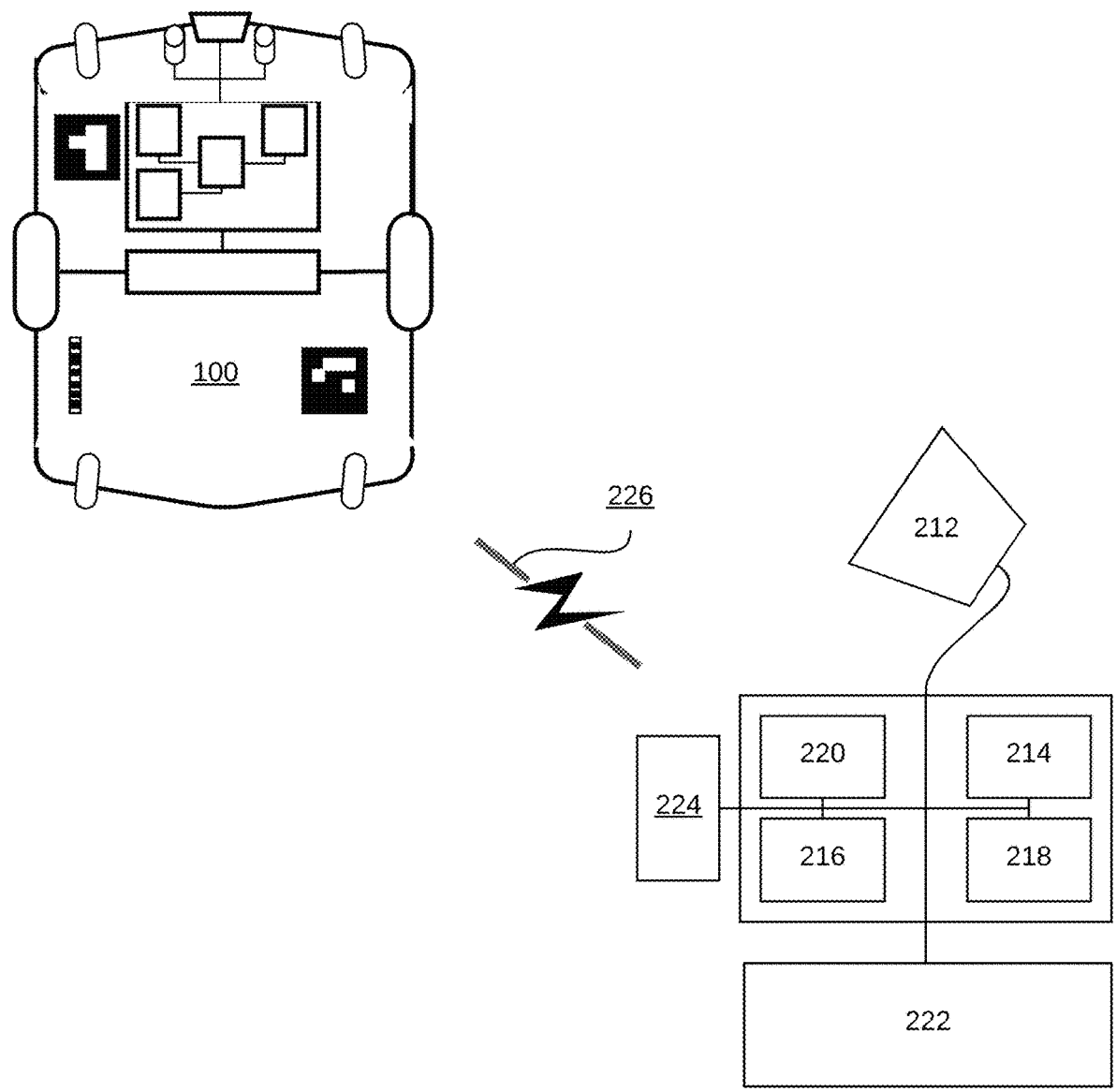
FIG. 2 is a system diagram of a system for monitoring a self-driving vehicle including the vehicle of FIG. 1, according to some embodiments.

Referring to FIG. 2, there is shown a system for monitoring a self-driving vehicle according to some embodiments. The system comprises a self-driving vehicle 100, a camera 212, a processor 214, a memory 216, a non-transient computer-readable medium 218, a communications transceiver 220, and a display device 222. According to some embodiments, the system may also comprise an additional sensor or scanner 224, such as an RFID reader, a second camera, or other optical sensor. Generally, any or all of the components 212 to 224 may be included in a single monitoring device. According to some embodiments, any of the components, such as the camera 212, display device 222, or scanner 224 may be external to the monitoring device. According to some embodiments, the monitoring device may be a mobile phone, tablet, or other mobile computing device. According to some embodiments, the communications transceiver 220 may form a wireless communications connection 226 with the vehicle 100.

In use, the camera 212 captures an image of the vehicle 100, which may be processed by the processor 214. If the vehicle 100 includes fiducial markers, and the fiducial markers are captured in the image, then the processor 214 may determine the unique identification, spatial location, and orientation of the vehicle 100 relative to the camera 212 and/or relative to the environment in which the vehicle 100 is operating by using the fiducial markers. If the vehicle 100 does not include fiducial markers, the processor 214 may determine the unique identification, spatial location, and orientation of the vehicle via methods known to those skilled in the art such as optical character recognition (OCR), visual simultaneous localization and mapping (VSLAM), or iterative closest-point matching (ICP).

The processor 214 requests vehicle information from the vehicle 100 via the communications transceiver 220 and the communications link 226. For example, a human user may use the monitoring device to request particular vehicle information from the vehicle 100. According to some embodiments, the vehicle information may comprise data defined in terms of a spatial reference.

After receiving the vehicle information, the processor 214 may display the image of the vehicle on the display device 222, along with a visual representation of the vehicle information that was received. In the case the vehicle information comprises data defined in terms of a spatial reference, the visual representation of the vehicle information may be provided relative to the spatial location and orientation of the vehicle 100.

Figure 3:
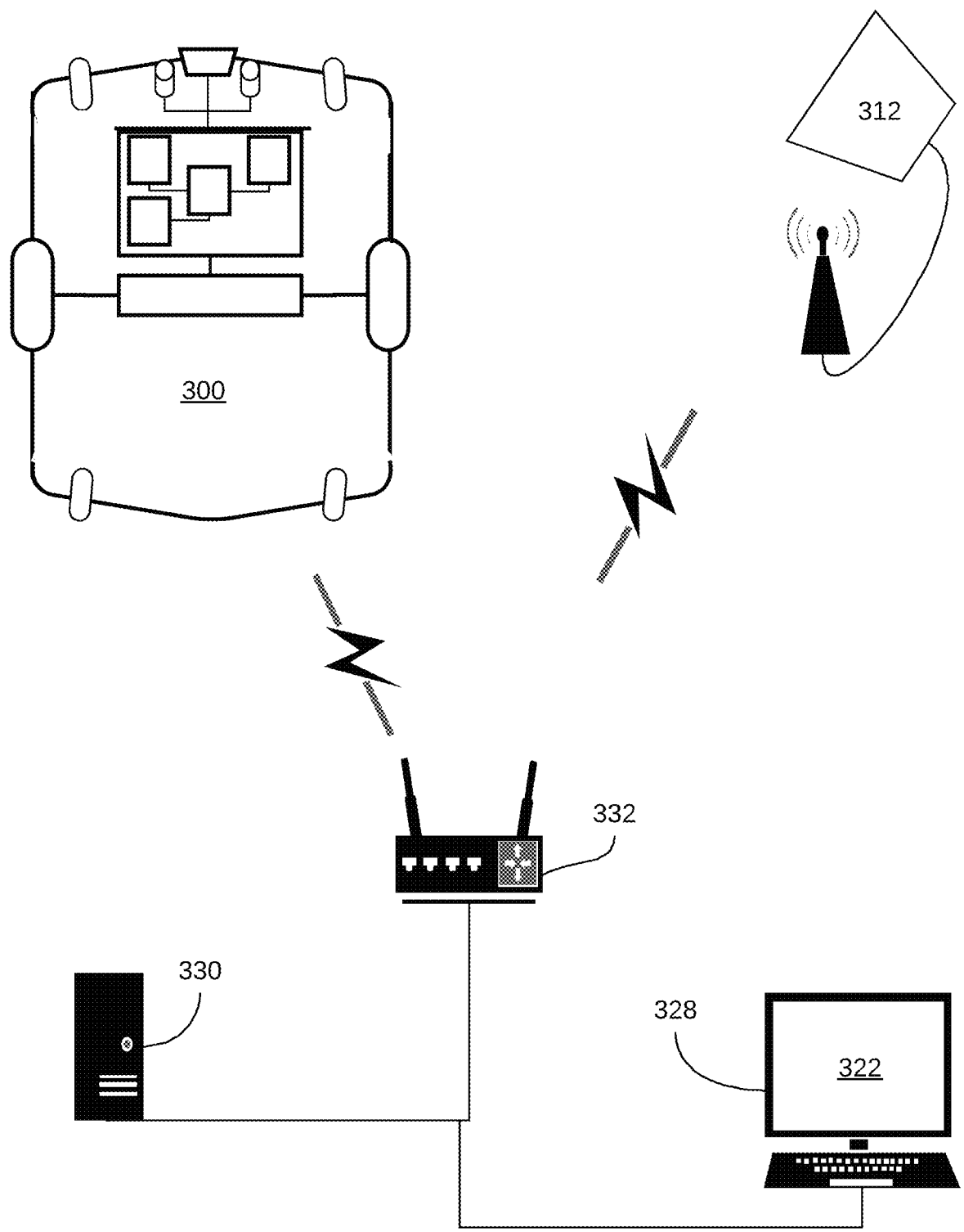
FIG. 3 is a system diagram of a system for monitoring a self-driving vehicle including the vehicle of FIG. 1, according to some embodiments.

Referring to FIG. 3, there is shown a system for monitoring a self-driving vehicle according to some embodiments. Similar reference numerals as used in FIG. 2 are used in FIG. 3 in order to identify similar or analogous components.

The system comprises a self-driving vehicle 300, a camera 312, a computer terminal 328 having a processor, memory, non-transient computer-readable medium, a communications transceiver, and a display device 322, a server 330, and networking equipment 332. The vehicle 300, the camera 312, the computer terminal 328, and the server 330 communicate via the networking equipment 332.

The example system shown in FIG. 3 differs from the example system shown in FIG. 2, in that the camera 312 may be remotely located from the computer terminal 328 (i.e. the monitoring device). For example, the camera 312 may be a camera that is mounted within an industrial facility, such as a security or other monitoring camera. Furthermore, the server 330 may be used to provide a fleet-management system that may store and manage some or all of the vehicle information for a fleet of vehicles. According to some embodiments, the system may comprise a fleet of vehicles including the vehicle 300, a plurality of cameras including the camera 312, and a plurality of computer terminals including the computer terminal 328.

In use, the camera 312 captures an image of the vehicle 300, which may be processed by the processor 314. If the vehicle 300 includes fiducial markers, and the fiducial markers are captured in the image, then the computer terminal 322 may determine the spatial location and orientation of the vehicle 300 relative to the camera 312 and/or relative to the environment in which the vehicle 300 is operating. For example, if the location of the camera 312 is fixed (such as in the case of a security camera), the location of the camera relative to the environment is known. If the vehicle 100 does not include fiducial markers, the processor 314 may determine the unique identification, spatial location, and orientation of the vehicle via methods known to those skilled in the art such as optical character recognition (OCR), visual simultaneous localization and mapping (VSLAM), or iterative closest-point matching (ICP).

The computer terminal 328 requests vehicle information from the vehicle 300 and/or the fleet-management system on the server 330 via the networking equipment 332. For example, a human user may use the computer terminal 328 to request particular vehicle information.

After receiving the vehicle information from the vehicle 300 and/or the fleet-management system on the server 330, the computer terminal 328 may display the image of the vehicle on its display device 322, along with a visual representation of the vehicle information that was received.

Figure 4:
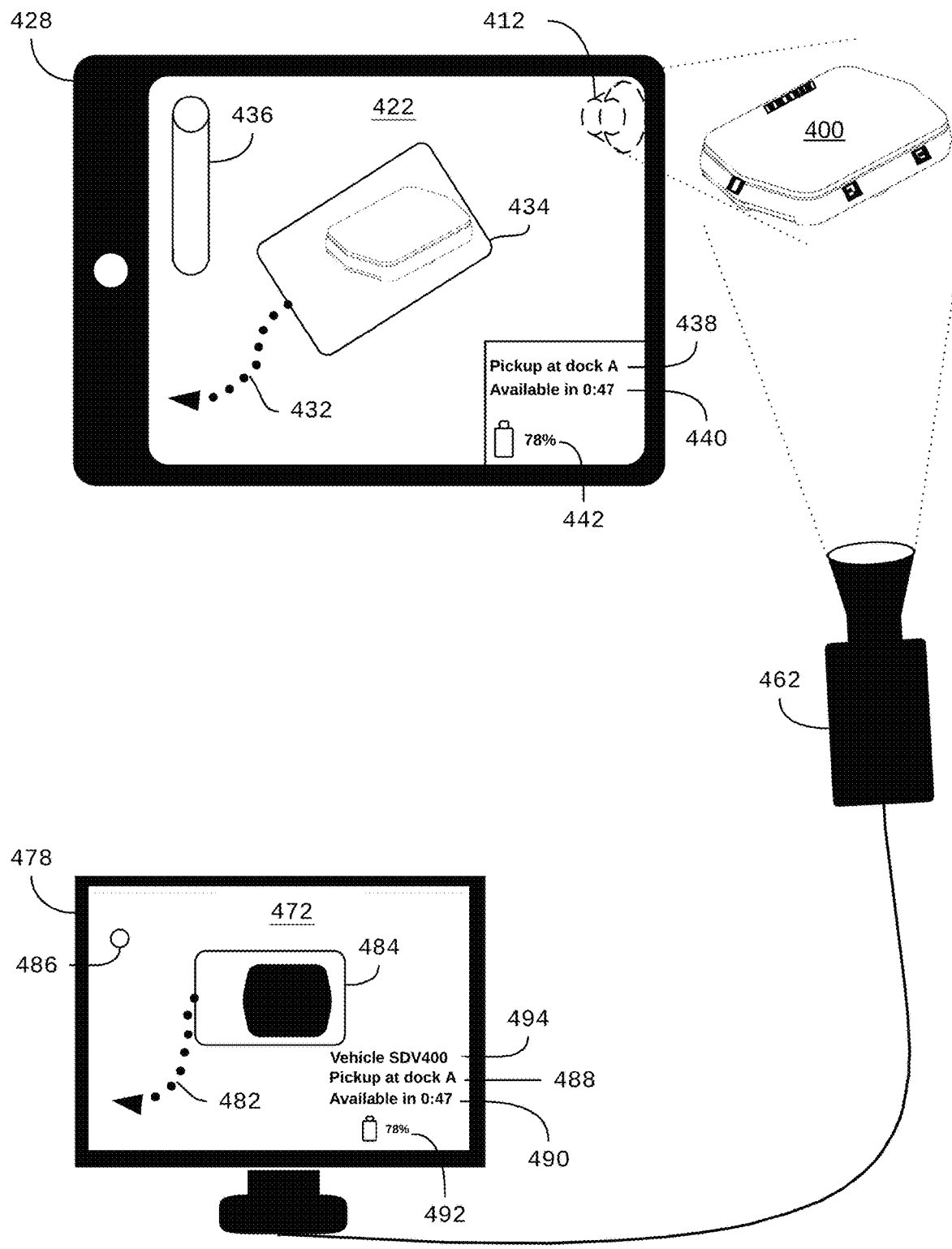
FIG. 4 is a diagram of a system for monitoring a self-driving vehicle, according to some embodiments.

Referring to FIG. 4, there is shown a system for monitoring a self-driving vehicle, according to some embodiments. The system is shown as comprising two different monitoring devices 428 and 478 for the sake of explanation. Similar reference numerals as used in FIG. 3 are used in FIG. 4 in order to identify similar or analogous components, and reference numerals offset by 50 are used with respect to the two monitoring devices 428 and 478.

As shown, the monitoring device 428 comprises a tablet device having an integrated camera 412 and an integrated display device 422. The camera 412 captures an image of a vehicle 400, which is displayed as a graphic on the display device 422. The graphic displayed on the display device 422 also includes visual representations of vehicle information that has been received by the monitoring device 428.

In the example shown, the visual representations of the vehicle information include the path that the vehicle is currently following 432, the boundary of the vehicle's safety field 434, an environmental feature or obstacle 436, an indication of the vehicle's current mission 438, the estimated time until the vehicle has completed its current mission 440, and the current state of charge of the vehicle's battery 442.

As shown, the spatial orientation of the vehicle's path 432, the safety field 434, and the environmental feature 436 are shown relative to the vehicle's orientation. Other aspects such as the current mission 438, the estimated time until the vehicle has completed its current mission 440, and the current state of charge of the vehicle's battery 442 are fixed relative to the display device 422. The determination of the relative orientation of each representation can be made statically at the time of design, or dynamically based on user preference.

As shown, the monitoring device 478 comprises a display device 472 in communication with an external camera 462. The camera 462 captures an image of a vehicle 400, which is displayed as a graphic on the display device 472. The graphic displayed on the display device 472 also includes visual representations of vehicle information that has been received by the monitoring device 478.

In the example shown, the visual representations of the vehicle information include the path that the vehicle is currently following 482, the boundary of the vehicle's safety field 484, an environmental feature or obstacle 486, an indication of the vehicle's current mission 488, the estimated time until the vehicle has completed its current mission 490, and the current state of charge of the vehicle's battery 492. In the example shown in FIG. 4, the identity 494 of the vehicle is also indicated.

As shown, the graphic is rendered in a plan view, and the vehicle's orientation has been translated accordingly in the graphic. The spatial orientation of the vehicle's path 482, the safety field 484, and the environmental feature 486 are shown relative to the vehicle's orientation in plan view.

According to some embodiments, any or all of the vehicle information may be provided by the vehicle and/or the fleet-information system. According to some embodiments, vehicle information pertaining to the environmental features and obstacles may be obtained from the vehicle's map, and/or from sensor scans performed by the vehicle in approximately real-time.

According to some embodiments, a graphic as shown on the display device 422, oriented based on the orientation of the vehicle 400 (e.g. isometric view), and a graphic as shown on the display device 472, in plan view, may both be shown on the same display device. For example, both may be shown simultaneously using a split-screen or picture-in-picture layout, or the display may be toggled between one graphic and the other.

Figure 5:
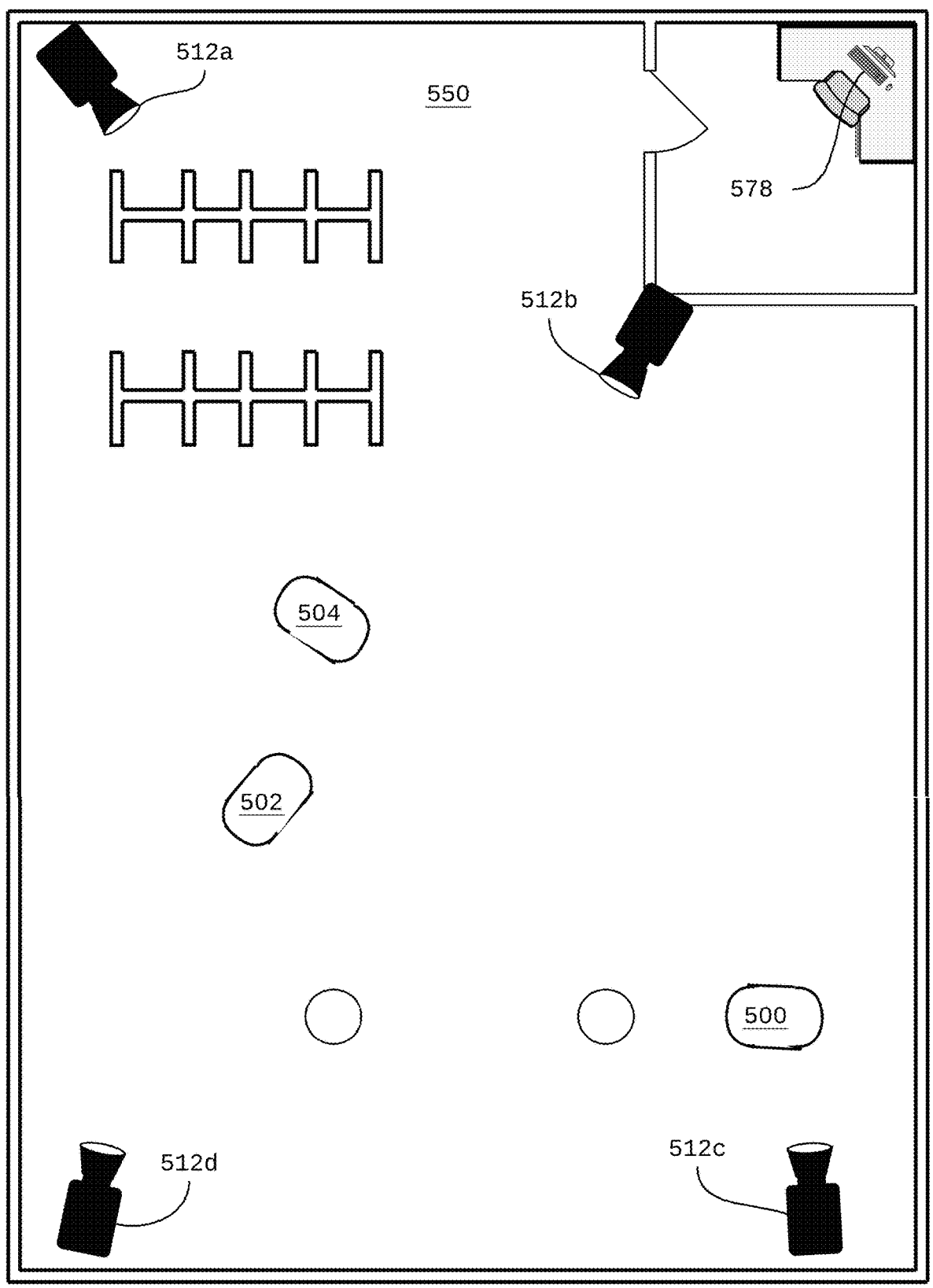
FIG. 5 is a diagram of a system for monitoring a self-driving vehicle in an industrial facility according to some embodiments.

Referring to FIG. 5, there is shown a facility 550 in which a system for monitoring self-driving vehicles is deployed. Some components of the system are not shown in FIG. 5, for example, a server for operating a fleet-management system, and communications networking equipment.

A plurality of self-driving vehicles, including the vehicles 500, 502, and 504 are operating in the facility 550. A plurality of cameras, including cameras 512a, 512b, 512c, and 512d are operating in the facility. According to some embodiments, the cameras (generally 512) may be fixed in a location within the facility 550, for example, by being mounted on a wall. Generally, the cameras may change their orientation, for example, by turning and zooming. A computer terminal 578 that is remote to the cameras and vehicles may be used as a monitoring device for monitoring the vehicles.

Figure 6:
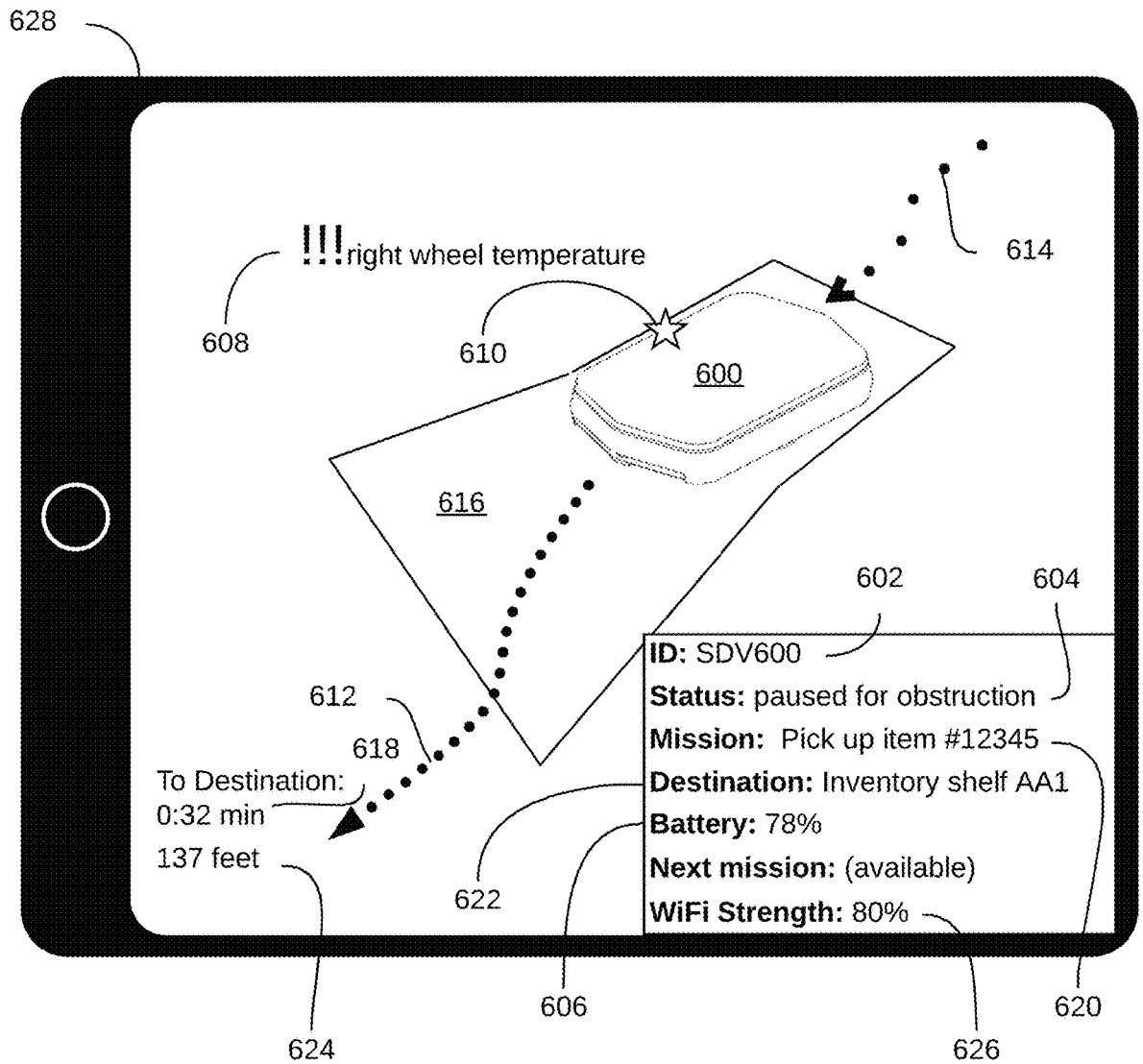
FIG. 6 is a diagram of a monitoring device including a display showing a graphic comprising an image of a self-driving vehicle and a visual representation of vehicle information, according to some embodiments.

Referring to FIG. 6, there is shown a monitoring device 628 in the form of a tablet, displaying a graphic comprising the image of a vehicle 600 and multiple visual representations of vehicle information.

As used herein, "vehicle information" pertains to any information that describes the vehicle, a state or condition of the vehicle and its surroundings, the performance of the vehicle, or the use of the vehicle. Generally, vehicle information can comprise vehicle-state information, vehicle-metric information, vehicle-mission information, and vehicle-environment information. The identity of the vehicle 600 as visually represented by the text 602 is an example of vehicle information.

According to some embodiments, vehicle-state information may include information pertaining to an operating state such as "underway to destination", "paused for obstruction", "paused for path planning", "emergency stopped", "available", "conducting mission (unavailable)", or "charging battery". For example, a vehicle may be underway to a destination and then stop moving. Subsequent to a request for vehicle information, a human operator may then be able to determine that the vehicle has stopped because an unexpected obstruction such as a human pedestrian or another vehicle has crossed the vehicle's path within its safety field, thereby causing the vehicle to pause. According to some embodiments, vehicle-state information may also include a time associated with the operating state. For example, if the vehicle is paused for an obstruction, a countdown timer may be displayed to show the expected delay until the vehicle resumes towards its destination. In this way, a human operator using a monitoring device can determine that the vehicle is not experiencing an emergency stop or a failure-state that would may require human intervention. The status as visually represented by the text 604 is an example of vehicle-state information.

Vehicle-state information may include battery charge information, such as a discrete charge level, a percentage charge level, a "charge required" state, or a "charge recommended" state. Furthermore, the vehicle-state information may indicate whether the vehicle is queued for a subsequent mission, or whether it will be available for a yet-to-be assigned mission after completing its current mission. The battery charge as visually represented by the text 606 is an example of vehicle-state information.

Vehicle-state information may include diagnostic information pertaining to the vehicle and/or its components and subsystems. For example, sensors within the vehicle may determine an abnormal operating condition, such as temperature, component speed (e.g. wheel speed, motor speed, etc.), electrical characteristics (e.g. voltage, current, impedance), dynamic characteristics (e.g. unexpected acceleration or jerk as measured by an inertial-measurement unit), and fluid pressures. The warning message as visually represented by the text 608 and the symbol 610 is an example of vehicle-state information.

Vehicle-state information may also include information pertaining to the current operation of the vehicle. The currently-planned path for the vehicle, as visually represented by dotted line 612, and the previously-followed path as visually represented by the dotted line 614 are examples of vehicle-state information. Similarly, the current safety field associated with the vehicle 600, as visually represented by the area 616 is an example of vehicle-state information.

According to some embodiments, vehicle-metric information may include information pertaining to the performance of the vehicle, such as vehicle speed, time in service (including separate times for the vehicle, its components and subsystems), time since last maintenance, time since last emergency stop, time since last battery charge, utilization rate (e.g. duty cycle based on amount of time spend fulfilling missions), average speed for missions, average speed, path efficiency (e.g. total distance travelled over a planned path as compared to displacement from origin to destination), duration of pauses for obstacles, duration of pauses for planning new paths, and time spent travelling from the destination of one mission to the origin of a subsequent mission. The time to destination, as visually represented by the text 618 is an example of information derived from vehicle-metric information.

According to some embodiments, vehicle-mission information may include information pertaining to a mission assigned to the vehicle, such as the origin of the mission, the destination of the mission, tasks associated with the mission, the purpose of the mission, time constraints pertaining to the mission, the priority of the mission, whether the mission is to be repeated, and the assignor of the mission. The nature of the mission, as visually represented by the text 620 and the destination as visually represented by the text 622 are examples of vehicle-mission information. Similarly, the current distance along the path the destination, as visually represented by the text 624 is an example of information derived from vehicle-mission information.

According to some embodiments, vehicle-environment information may include information pertaining to the temperature, humidity, lighting, communication signal strength (e.g. WiFi signal strength), the number of other vehicles within a given proximity to the vehicle 600 (or vehicles meeting particular criteria based on, for example, vehicle-state information), physical features detected by the vehicle's sensors (e.g. LiDAR scanners), audio signal levels, areas of the facility floor where traction problems have been detect, and audio or video (or other images) captured by the vehicles sensors (e.g. microphone, cameras). The WiFi strength, as visually represented by the text 626 is an example of vehicle-environment information.

Figure 7:
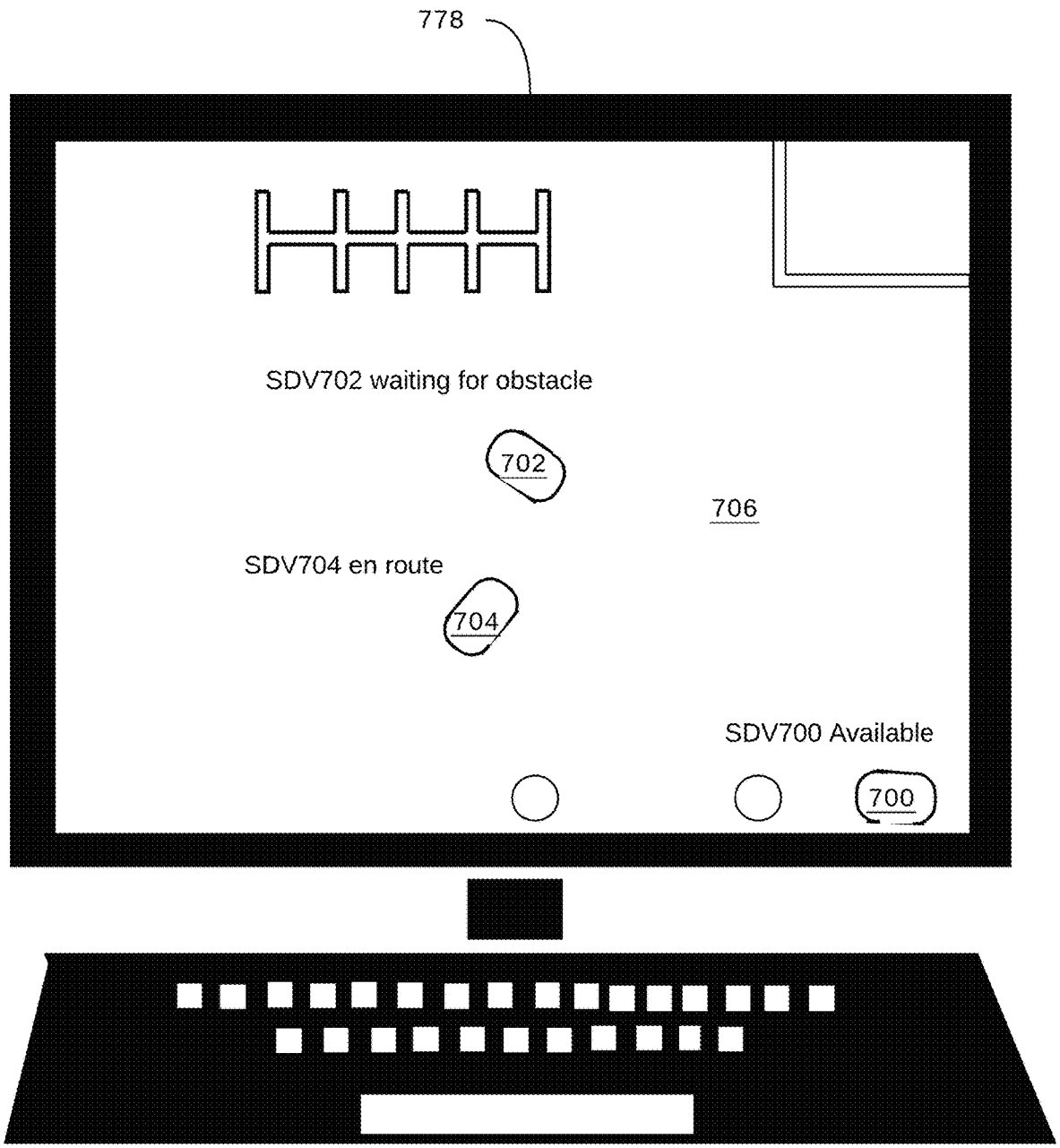
FIG. 7 is a diagram of a monitoring device including a display showing a graphic comprising a map of a facility with images of a plurality of self-driving vehicles, and vehicle information associated with each self-driving vehicle, according to some embodiments.

Referring to FIG. 7, there is shown a monitoring device 778 in the form of a computer terminal, displaying a graphic comprising the images of three vehicles, 700, 702, and 704, for example as may have been obtained from more than one camera, along with visual representations of vehicle information associated with each vehicle. The graphic shown in FIG. 7 is based on a plan-view map 706 of the facility, for example, using the map of the facility stored on a vehicle and/or a fleet-management system in communication with the monitoring device 778.

Figure 8:
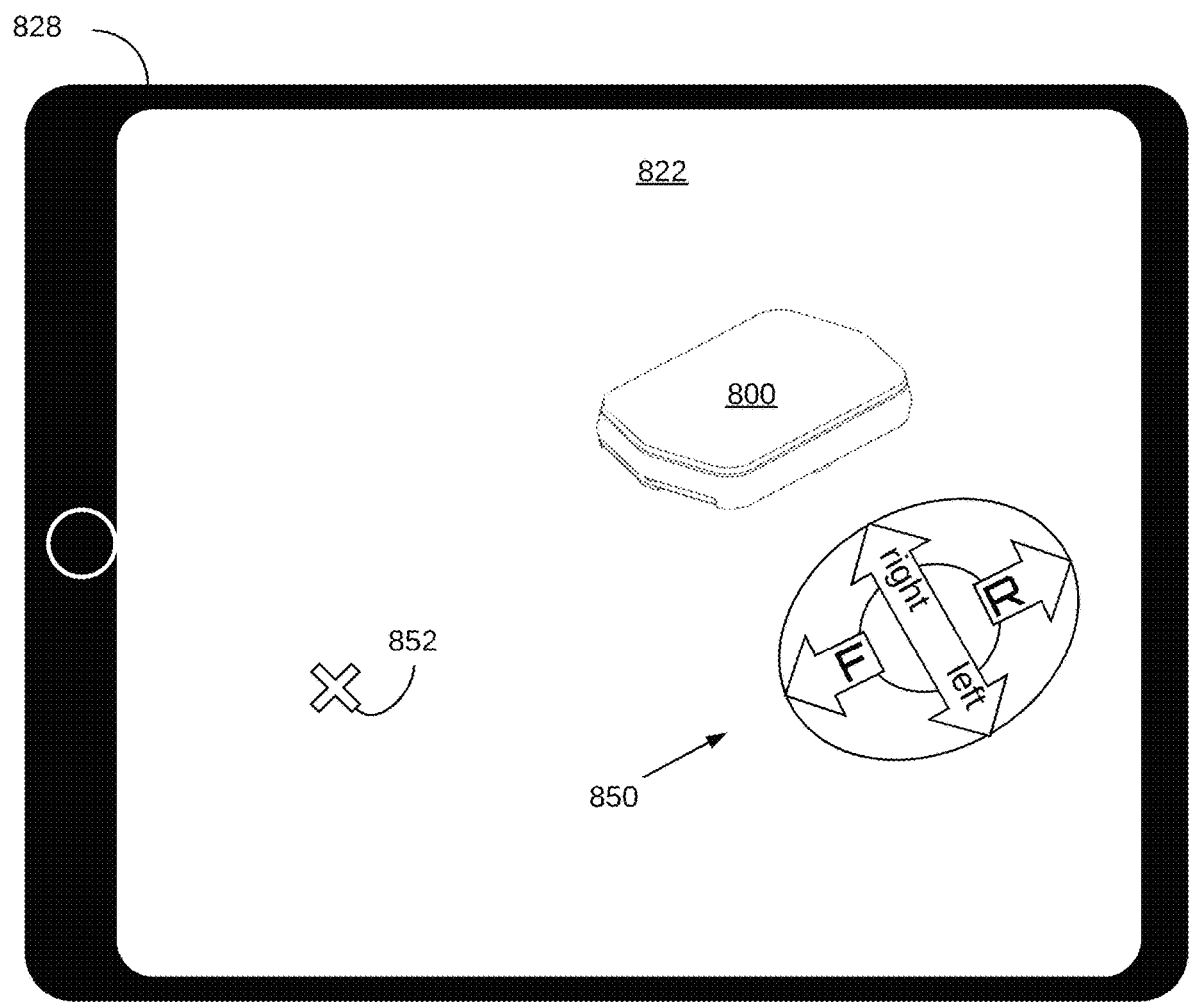
FIG. 8 is a diagram of a monitoring device including a display showing a graphic comprising an image of a self-driving vehicle and input buttons for controlling the vehicle.

Referring to FIG. 8, there is shown a monitoring device 828 in the form of a tablet, displaying a graphic comprising the image of a vehicle 800 and input buttons 850. The input buttons may generally be used to command the vehicle, for example, as described in U.S. Patent Application No. 62/486,936 filed on 18 Apr. 2017, which is hereby incorporated by reference.

According to some embodiments, the input buttons 850 may comprise a "joystick" type control for providing commands to move the vehicle. For example, as shown in FIG. 8, the input buttons 850 include a forward ("F") button, a reverse ("R") button, a "right" button, and a "left" button.

According to some embodiments, since the image of the vehicle 800 represents a proper orientation and spatial location of the vehicle relative to the camera (e.g. based on any or all of fiducial markers, OCR, VSLAM, and ICP), the input buttons 850 can be displayed on a display device 822 of the monitoring device 828 with an orientation that is determined relative to the orientation of the vehicle.

For example, as shown in FIG. 8, the input buttons 850 are shown such that the forward and reverse buttons are aligned with the body of the vehicle in the forwards and reverse directions respectively. Similarly, the right and left buttons are oriented in the right and left directions of the vehicle. As such, as the orientation of the vehicle with respect to the camera (e.g. the monitoring device 828 that includes an integrated camera), a human user of the monitoring device 828 can be presented with input buttons 850 that allow intuitive control of the vehicle, without requiring the human user to translate the orientation between themselves and the vehicle. In other words, as exemplified by the arrow-shaped input buttons in FIG. 8, the arrows will always point in the proper direction relative to the image of the vehicle 800.

According to some embodiments, the display device 822 of the monitoring device 828 may be used to obtain other navigational inputs from a human user as well. For example, a user may input a point 852 on display device 822 in order establish a waypoint or goal towards which the self-driving vehicle will travel. It is assumed that the point 852 is intended to correspond to a point on the floor on which the vehicle is travelling (i.e. on the same vertical plane as the vehicle). Therefore, it is necessary to translate the position of the point 852 on the display device 822 to a corresponding point on the floor of the facility in which the vehicle is operating. This translation can be accomplished based on the orientation and special location that was performed (e.g. based on any or all of fiducial markers, OCR, VSLAM, and ICP).

Figure 9:
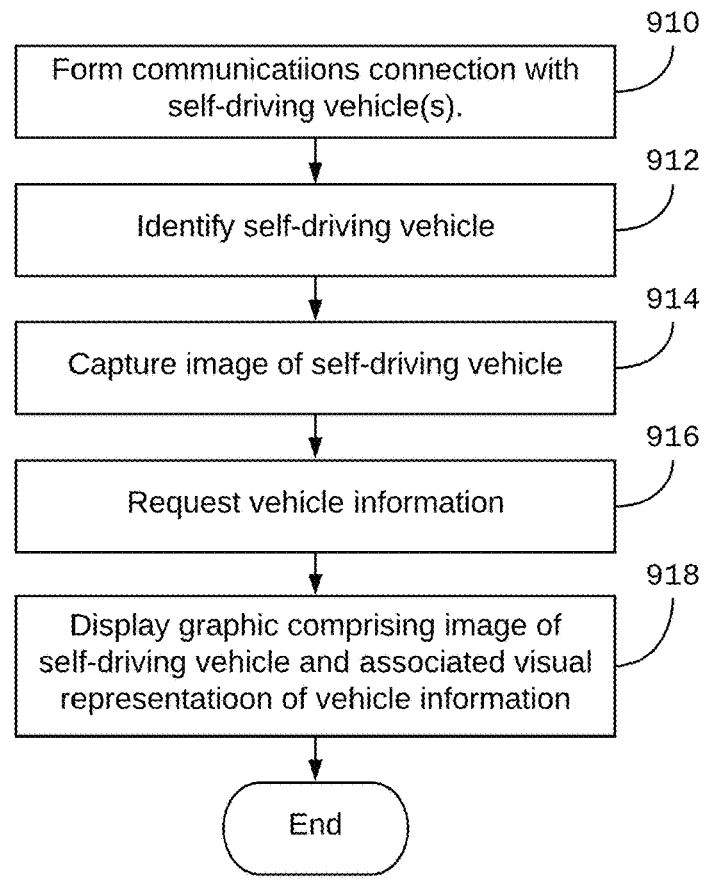
FIG. 9 is a flow diagram depicting a method of monitoring a self-driving vehicle according to some embodiments.

Referring to FIG. 9, there is shown a method 900 of monitoring a self-driving vehicle. The method 900 may be implemented using one or more computer processors, such as those included in any or all of a self-driving vehicle, a monitoring device, a fleet-management system, and a computer terminal. Non-transitory computer-readable media associated with one or more processors may store computer-readable instructions for configuring the one or more processors to execute the steps of the method 900.

According to some embodiments, the method 900 may start at step 910 when a communications connection is formed with one or more self-driving vehicles. According to some embodiments, the connection may be formed using a monitoring device such as a tablet or another computer.

In some embodiments, the communications connection may be a WiFi connection that is made using a WiFi transceiver in the monitoring device. For example, in the case that the self-driving vehicle is configured to provide a server, the WiFi transceiver in the monitoring device may directly connect to a WiFi transceiver in the vehicle in order to communicate with the server.

In some cases, a monitoring device may form a communications connection with one or more vehicles using a network, which may include a fleet-management server and/or a computer terminal.

According to some embodiments, the communications connection may be established by first obtaining communications networking information from fiducial markers placed on the vehicle. For example, a label may be scanned using a camera or other optical sensor in order to obtain connection information such as a URL or IP address. After the connection information has been obtained by the monitoring device, the monitoring device may form the communications connection based on the connection information.

At step 912, a self-driving vehicle is identified. According to some embodiments, the self-driving vehicle may be identified based on one or all of a communications network address or other communications parameter, visual recognition of fiducial markers placed on the vehicle or visual recognition of the vehicle itself, and the location of the vehicle.

For example, in the case that step 910 is employed and the monitoring device forms a communications link with the vehicle, an IP address, MAC address, etc. associated with the vehicle may be used to uniquely identify the vehicle. According to some embodiments, the steps 910 and 912 may be executed as a single step, in that, if a direct connection is formed between the monitoring device and the vehicle, then the vehicle has necessarily been identified as a result. In other words, according to some embodiments, if the monitoring device is only connected to a single vehicle, then there is no need to specifically identify that vehicle in order to distinguish it from other vehicles.

At step 914, an image is captured of the self-driving vehicle. The image is generally captured using a camera, and may be in the form of a single image, or a video (e.g. comprising a series of images). According to some embodiments, the camera may be embedded in the monitoring device. According to some embodiments, the camera may be externally connected to the monitoring device. According to some embodiments, multiple external cameras (e.g. security cameras) may be connected via a network to any or all of the monitoring device, a fleet-management system, and a computer terminal.

According to some embodiments, steps 910, 912, and 914 may be executed as a single step, in that, in the process of capturing the image of the vehicle, connection information may be simultaneously obtained from the image, and the identity may be therefore available either implicitly or explicitly.

At step 916, vehicle information is requested. According to some embodiments, the vehicle information may be requested automatically, or as the result of an action by human operator of a monitoring device. According to some embodiments, vehicle information may comprise vehicle-state information, vehicle-metric information, vehicle-mission information, and/or vehicle-environment information.

At step 918, a graphic may be rendered and displayed on a display device. According to some embodiments, the display device may be integrated in a monitoring device that includes a camera, or the display device may be remotely located from the camera. According to some environments, the graphic comprises an image of the self-driving vehicle, and associated visual representations of the vehicle information. According to some embodiments, the vehicle information may be visually represented so that it is spatially located and oriented based on the spatial location and orientation of the vehicle in the image.

According to some embodiments, the method 900 may be performed for multiple vehicles simultaneously. According to some embodiments, the method 900 may be performed using multiple cameras. For example, the steps of method 900 may be executed in parallel for each of a plurality of vehicles, or the steps of method 900 may be executed sequentially, with an iteration for each of a plurality of vehicles.

The present invention has been described here by way of example only. Various modification and variations may be made to these exemplary embodiments without departing from the spirit and scope of the invention, which is limited only by the appended claims.

We claim:

1. A device for monitoring a plurality of self-driving vehicles, comprising:
 a processor;
 a camera in communication with the processor;
 a communications transceiver in communication with the processor for communicating with the plurality of self-driving vehicles;
 a computer-readable medium in communication with the processor;
 a display device in communication with the processor, the display device being adjacent to the camera;
 the computer-readable medium storing instructions that, when executed, configure the processor to:
  receive an image of at least one unidentified self-driving vehicle of the plurality of self-driving vehicles, the image captured by the camera;
  identify the at least one unidentified self-driving vehicle based on the image captured by the camera;
  determine an orientation of the at least one identified self-driving vehicle relative to the camera based on the image captured by the camera;
  receive vehicle information associated with the at least one identified self-driving vehicle;
  generate a graphic comprising at least one visual representation of the vehicle information, wherein the at least one visual representation of the vehicle information is oriented within the graphic based on the orientation of the at least one identified self-driving vehicle relative to the camera; and
  display the graphic on the display device.

2. The device of claim 1, wherein the at least one visual representation of the vehicle information comprises a plurality of visual representations of the vehicle information.

3. The device of claim 1, wherein the vehicle information comprises component information associated with one or more components of the identified self-driving vehicle.

4. The device of claim 3, wherein the component information comprises at least one motor speed of the at least one identified self-driving vehicle.

5. The device of claim 3, wherein the component information comprises at least one motor temperature of the at least one identified self-driving vehicle.

6. The device of claim 3, wherein the component status information comprises a chassis condition of the at least one identified self-driving vehicle.

7. The device of claim 1, wherein the at least one visual representation of the vehicle information comprises at least one non-textual visual representation.

8. A method for monitoring a plurality of self-driving vehicles, comprising:
 capturing an image of at least one unidentified self-driving vehicle of the plurality of self-driving vehicles using a monitoring device in communication with the plurality of self-driving vehicles;
 identifying the at least one unidentified self-driving vehicle based on the image captured by the monitoring device;
 determining an orientation of the at least one identified self-driving vehicle relative to the monitoring device based on the image captured by the monitoring device;
 receiving vehicle information associated with the at least one identified self-driving vehicle using the monitoring device;
 generating a graphic comprising at least one visual representation of the vehicle information, wherein the at least one visual representation of the vehicle information is oriented within the graphic based on the orientation of the at least one identified self-driving vehicle relative to the monitoring device; and
 displaying the graphic at the monitoring device.

9. The method of claim 8, wherein the at least one visual representation of the vehicle information comprises a plurality of visual representations of the vehicle information.

10. The method of claim 8, wherein the vehicle information comprises component information associated with one or more components of the identified self-driving vehicle.

11. The method of claim 10, wherein the component information comprises at least one motor speed of the at least one identified self-driving vehicle.

12. The method of claim 10, wherein the component information comprises at least one motor temperature of the at least one identified self-driving vehicle.

13. The method of claim 10, wherein the component status information comprises a chassis condition of the at least one identified self-driving vehicle.

14. The method of claim 8, wherein the at least one visual representation of the vehicle information comprises at least one non-textual visual representation.

15. A system for monitoring a plurality of self-driving vehicles, comprising:
a fleet-management system for communicating with the plurality of self-driving vehicles;
a display terminal in communication with the fleet-management system;
one or more cameras in communication with the display terminal, at least one camera of the one or more cameras being adjacent to the display terminal; the display terminal having a display device, a processor, and a computer-readable medium storing instructions that, when executed, configure the processor to:
receive an image of at least one unidentified self-driving vehicle of the plurality of self-driving vehicles, the image captured by the at least one camera;
identify the at least one unidentified self-driving vehicle based on the image captured by the at least one camera;
determine an orientation of the at least one identified self-driving vehicle relative to the at least one camera based on the image captured by the at least one camera;
receive vehicle information associated with the at least one identified self-driving vehicle;
generate a graphic comprising at least one visual representation of the vehicle information, wherein the at least one visual representation of the vehicle information is oriented within the graphic based on the orientation of the at least one identified self-driving vehicle relative to the at least one camera; and
display the graphic on the display device.

16. The system of claim 15, wherein the at least one visual representation of the vehicle information comprises a plurality of visual representations of the vehicle information.

17. The system of claim 15, wherein the vehicle information comprises component information associated with one or more components of the identified self-driving vehicle.

18. The system of claim 17, wherein the component information comprises at least one motor speed of the at least one identified self-driving vehicle.

19. The system of claim 17, wherein the component information comprises at least one motor temperature of the at least one identified self-driving vehicle.

20. The system of claim 17, wherein the component status information comprises a chassis condition of the at least one identified self-driving vehicle.

21. The system of claim 15, wherein the at least one visual representation of the vehicle information comprises at least one non-textual visual representation.

* * * * *